(12) United States Patent
Marx et al.

(10) Patent No.: US 9,049,814 B2
(45) Date of Patent: Jun. 9, 2015

(54) COATED SEEDS AND METHODS OF MAKING COATED SEEDS

(75) Inventors: Donald H. Marx, Frogmore, SC (US); Gregory Keith Lewis, Wake Forest, NC (US)

(73) Assignee: VamTech, LLC, Pittsburgh, PA (US)

( * ) Notice: Subject to any disclaimer, the term of this patent is extended or adjusted under 35 U.S.C. 154(b) by 1114 days.

(21) Appl. No.: 12/011,819

(22) Filed: Jan. 30, 2008

(65) Prior Publication Data

US 2008/0207448 A1 Aug. 28, 2008

Related U.S. Application Data

(60) Provisional application No. 60/903,087, filed on Feb. 23, 2007.

(51) Int. Cl.
*A01C 1/06* (2006.01)
*A01N 25/26* (2006.01)

(52) U.S. Cl.
CPC ........................................ *A01C 1/06* (2013.01)

(58) Field of Classification Search
None
See application file for complete search history.

(56) References Cited

U.S. PATENT DOCUMENTS

| | | | |
|---|---|---|---|
| 5,002,603 A | 3/1991 | Safir et al. | |
| 5,085,682 A * | 2/1992 | Safir et al. | 504/108 |
| 5,125,955 A | 6/1992 | Safir et al. | |
| 5,446,138 A * | 8/1995 | Blaiseu et al. | 536/23.74 |
| 5,691,275 A * | 11/1997 | Nair et al. | 504/108 |
| 5,918,413 A | 7/1999 | Otani et al. | |
| 5,981,775 A | 11/1999 | Sreenivasan et al. | |
| 6,020,288 A * | 2/2000 | Nonomura et al. | 504/127 |
| 6,146,668 A | 11/2000 | Kelly et al. | |
| 6,329,319 B1 | 12/2001 | Puglisi et al. | |
| 7,038,113 B1 * | 5/2006 | Dixon et al. | 800/312 |
| 7,098,378 B2 | 8/2006 | Sainz et al. | |
| 2002/0095864 A1 * | 7/2002 | Obert et al. | 47/57.6 |
| 2002/0115565 A1 | 8/2002 | Asrar et al. | |
| 2003/0172396 A1 | 9/2003 | Cohen et al. | |
| 2003/0224936 A1 * | 12/2003 | Kretzschmar | 504/100 |
| 2005/0209103 A1 * | 9/2005 | Schlatter et al. | 504/100 |
| 2006/0032120 A1 * | 2/2006 | McPherson | 47/57.6 |
| 2010/0125040 A1 * | 5/2010 | Weiss et al. | 504/100 |

FOREIGN PATENT DOCUMENTS

| | | |
|---|---|---|
| CA | 2461261 | 9/2005 |
| EP | 817781 B1 * | 4/2004 |
| WO | WO 0035277 A1 * | 6/2000 |
| WO | WO 2005/077170 A1 | 8/2005 |
| WO | WO 2005087005 A1 * | 9/2005 |

OTHER PUBLICATIONS

Burrows et al., "Fungicide Seed Treatments Minimally Affect Arbuscular-Mycorrhizal Fungal (AMF) Colonization of Selected Vegetable Crops", Journal of Biological Sciences 7(2): 417-420, 2007.*
Syngenta, "Maxim XL," <http://www.syngenta.com/country/eg/en/cropprptection/ourproducts/seedcare/Pages/MaximXL035FS.aspx>, copyright 2010, p. 1.*
Megadi et al., "Bacterial degradation of fungicide captan (Abstract)," J Agric Food Chem., published Dec. 22, 2010; 58(24), p. 1.*
AgChem Access, "Fludioxonil," <http://www.agchemaccess.com/Fludioxonil>, copyright 2013, p. 1-2.*
Hermann, D., "Phenylamides," <http://www.frac.info/work/work_phen.htm> Copyright FRAC 2005, p. 1-5.*
Hwang, S.F., "Effects of VA mycorrhizae and metalaxyl on growth of alfalfa seedlings in soils from fields with 'alfalfa sickness' in Alberta," 1988, Plant Disease 72:448-452.*
PCT/US08/02310 International Search Report dated Jul. 14, 2008.
Baptista MJ and Siqueira JO (1994) Effect of flavonoids on spore germination and asymbiotic growth of the arbuscular mycorrhizal fungus Gigaspora gigantea. Brazilian Journal of Plant Physiology 6(2):127-134.
Da Silva JP and Siqueira JO (1997) Soil-applied synthetic formononetin stimulates arbuscular mycorrhizal formation in corn and soybean. Brazilian Journal of Plant Physiology 9(1):35-41.
Da Silva JP and Siqueira JO (1998) Mycorrhizal colonization and growth of soybean influenced by different fungal species and application of the isoflavonoid formononetin. Pesquisa Agropecuaria Brasileira 33(6):953-959.
Davies FT (2005) Influence of arbuscular mycorrhizae indigenous to Peru and a flavonoid on growth, yield, and leaf elemental concentration of 'Yungay' potatoes. HortScience 40(2):381-385.
Davies FT, Calderon CM, Huaman Z and Gomez R (2005) Influence of a flavonoid (formononetin) on mycorrhizal activity and potato crop productivity in the highlands of Peru. Scientia Horticulturae 106:318-329.
Elmer W (2002) Influence of formononetin and NaCl on mycorrhizal colonization and Fusarium crown and root rot of asparagus. Plant Disease 86(12):1318-1324.
Fries LLM, Pacovsky RS, and Safir GR (1998) Influence of phosphorus and formononetin on isozyme expression in the Zea mays-Glomus intraradices symbiosis Physiologia Plantarum 103:172-180.
Graham TL (1991) Flavonoid and isoflavonoid distribution in developing soybean seedling tissues and in seed and root exudates. Plant Physiology 95(2):594-603.
Koide RT, Landherr LL, Besmer YL, Detweiler JM and Holcomb EJ (1999) Strategies for mycorrhizal inoculation of six annual bedding plant species. HortScience 34(7):1217-1220.

(Continued)

*Primary Examiner* — Tracy Vivlemore
*Assistant Examiner* — Monica Shin
(74) *Attorney, Agent, or Firm* — Buchanan Ingersoll & Rooney PC (57) ABSTRACT

Seed coatings and coated seeds as provided herein include at least one fungicide and at least one VAM fungus-enhancing composition. Coated seeds exhibit enhanced growth due to depression or elimination of undesirable fungi coupled with either enhanced growth of VAM fungus or lack of detrimental fungicide effect on VAM fungus.

14 Claims, 4 Drawing Sheets

(56) References Cited

OTHER PUBLICATIONS

Kormanik PP And McGraw AC (1984) Quantification of vesicular-arbuscular mycorrhizae in plant roots. In N.C. Schenck (ed.) Methods and Principles of Mycorrhizal Research American Phytopathological Society, St. Paul, MN.

Muchovej RM (2001) Importance of Mycorrhizae for Agricultural Crops. Florida Cooperative Extension Service Bulletin SS-AGR-170.

Nair MG, Safir GR and Siqueira JO (1991) Isolation and identification of vesicular-arbuscular mycorrhiza-stimulatory compounds from clover (Trifolium repens) roots Applied and Environmental Microbiology 57(2):434-439.

Ozan A, Safir GR and Nair MG (1996) Isozyme activity of developing Trifolium-Glomus mycorrhiza and associated effects of the isoflavone formononetin. Allelopathy Journal 3(2).

Phillips JM and Hayman DS (1970) Improved procedures for clearing roots and staining parasitic and vesicular-arbuscular mycorrhizal fungi for rapid assessment of infection. Trans. Br. Mycol. Soc. 55(1):158-161.

Read DJ, Koucheki HK and Hodgson J (1976) Vesicular-arbuscular mycorrhiza in natural vegetation systems. New Phytol. 77:641-653.

Schussler A, Schwarzott D and Walker C (2001) A new fungal phylum, the Glomeromycota: phylogeny and evolution. Mycological Research 105(12):1413-1421.

Simon L, Bousquet J, Levesque C and Lalonde M (1993) Origin and diversification of endomycorrhizal fungi and coincidence with vascular land plants. Nature 363:67-69.

Siqueira JO, Safir GR and Nair MG (1991) VA-mycorrhizae and mycorrhiza stimulating isoflavonoid compounds reduce herbicide injury. Plant and Soil 134:233-242.

Siqueira JO, Safir GR and Nair MG (1991) Stimulation of vesicular-arbuscular mycorrhiza formation and growth of white clover by flavonoid compounds. New Phytologist 118:87-93.

Munkvold, G et al., Iowa State University, University Extension, Iowa Commercial Pesticide Applicator Manual, Category 4, Seed Treatment, (Feb. 1999) pp. 1-36.

Bowden, R et al., Kansas State University Agricultural Experiment Station and Cooperative Extension Service, Pesticide Application Training, Category 4, Seed Treatment, (Sep. 1998) pp. 1-31.

Oregon State University, Crop and Soil Science, CSS 460/560 Seed Production, Seed Treatment.

Mathre, D E et al. (2001) Small Grain Cereal Seed Treatment: The Plant Health Instructor. DOI. 10. 1094/PHI-1-2001-1008-01, Updated 2006, pp. 1-12.

Seed Treatment and Environment Committee of the International Seed Trade Federation (FIS), Seed Treatment, A Tool for Sustainable Agriculture, (1999), pp. 1-8.

Leubner, G, The Seed Biology Place—Seed Technology and Biotechnology, (Jan. 2007) pp. 1-4.

Bowen et al., Effect of a Select Group of Seed Protectant Fungicides on Growth of Sclerotinia minor In Vitro and Its Recovery from Infested Peanut Seed, Plant Disease (Nov. 2000), pp. 1217-1220.

Jedinak et al., Approaches to Flavonoid Production in Plant Tissue Cultures, Biologia, Bratislava, 59/6 (2004) pp. 697-710.

Deavours, B E. et al., Metabolic Engineering of Isoflavonoid Biosynthesis in Alfalfa, Plant Physiology (Aug. 2005) vol. 138, pp. 2245-2259.

Paulsrud, B et al., Oregon Pesticide Applicator Training Manual Seed Treatment, University of Illinois Board of Trustees (2001) pp. 1-24.

Balasubramanian, P, Biotechnology in Plant Disease Control, Biotechnology in Plant Disease Control, Foundation for Biotechnology Awareness and Education, (2007) pp. 1-3.

Krishnamurthy, K et al., Wheat Puroindolines Enhance Fungal Disease Resistance in Transgenic Rice, Molecular Plant-Microbe Interactions, (2001) vol. 14, No. 10, pp. 1255-1260.

Agrevo Pty Ltd., PR-93: Development of Fungal Disease Resistant Canola Cultivars.

Fungicide Resistance Action Committee, FRAC Code List 1: Fungicides Sorted by FRAC Code.

Yu et al. Metabolic Engineering of Isoflavone Biosynthesis, Advances in Agronomy (2005), vol. 86, pp. 147-190.

Potter, B., Yield Effects of Seed Applied Fungicide, Insecticide and Rhizobium Innoculants on Soybean, Univ. of MN Dept. of Entomology & Southwest Research & Outreach Center.

Turk, M.A. et al., Significance of Mycorrhizae, World Journal of Agricultural Sciences (2006), 2(1), pp. 16-20.

Muchovej, J.J. et al., Effect of Kind and Method of Fungicidal Treatment of Bean Seed on Infections by the VA-mycorrhizal Fungus Glomus Macrocarpum and by the Pathogenic Fungus Fusarium solani, Plant and Soil (1991), vol. 132, pp. 47-51.

Chart 1: Stimulation of VAM development by Myconate; Chart 2: Experimental Results (2 pages).

Aziz, T. et al., Inhibition of Mycorrhizal Symbiosis in Leucaena Leucocephala by Chlorothalonil, Mycorrhizal Literature Exchange, web page printout, Plant and Soil, 131(1) pgs. 47-52.

Kough et al., Vesicular-Arbuscular Mycorrhizal Fungi after Fungicide Applications (Mar. 1987).

Chiocchio et al., Effect of the Fungicide Benomyl on Spore Germination and Hyphal Length of the Arbuscular Mycorrhizal Fungus Glomus Mosseae, Internatl. Microbiol, (2000), vol. 3, pp. 173-175.

Gnekow, M.A. et al., Influence of the Fungicide Pentachloronitrobenzene on VA-mycorrhizal and Total Root Length and Phosphorus Uptake of Oats (Avena sativa), Plant and Soil (1989), vol. 114, pp. 91-98.

Chapter 2, Seed Treatment, pp. 11-16.

Plant Health Care PLC, Annual Report and Accounts for the Year Ended Dec. 31, 2006.

Plant Health Care PLC, 2005 Annual Report.

Plant Health Care PLC, Annual Report and Accounts for the year ended Dec. 31, 2004.

Murillo-Williams, Adriana and Pedersen, Palle, "Arbuscular Mycorrhizal Colonization Response to Three Seed-Applied fungicides", Agron. J., vol. 100, Issue 3, pp. 795-800 (2008).

* cited by examiner

Figure 1. Stimulation of VAM development by Myconate:

Demonstration of the effectiveness of Myconate at various dose rates in stimulating colonization of corn and cotton roots by VAM fungi after 8 and 10 weeks growth respectively.

Figure 2. Experimental results:

FIGURE 3

Formononetin and Derivatives Biosynthesis

Figure 4. Effect of Myconate kf on VAM Colonization in Corn (Laboratory Studies 2007).

Values are the means of 5 replicated VAM colonization measurements produced by Myconate kf applied at stated rates. Mean values followed by the same letter are not significantly different (p=0.05).

COATED SEEDS AND METHODS OF MAKING COATED SEEDS

PRIORITY CLAIM

This application claims priority to U.S. Provisional Patent Application No. 60/903,087, filed on Feb. 23, 2007. The entire contents of that application are incorporated by reference herein.

BACKGROUND OF THE INVENTION

1. Field of the Invention

Embodiments of the invention relate to a coated seed. Further embodiments of the invention relate to a process for producing a coated seed. More specifically, embodiments of the invention relate to a coated seed obtained by coating a seed with a fungicide and at least one of an alkali metal formononetinate and form ononetin. Further embodiments may relate to providing a coated seed that has been genetically engineered to produce a protein having fungicidal activity and/or a vesicular arbuscular mycorrhizal (VAM) fungus enhancing composition and/or any other protein conferring any trait whatsoever. Coatings of the invention stimulate plant growth and yields from the coated seeds by stimulating growth of beneficial mycorrhizal fungi and depressing growth of other pathogenic fungi on roots. "MYCONATE®" is the commercial or trade name for preparations of formononetin and/or potassium formononetinate. In the following, when the term MYCONATE® is used care has been taken to designate whether formononetin or potassium formononetinate was used in the preparation in question. MYCONATE® is a registered trademark of VAMTech, LLC.

2. Background

Mycorrhiza is a symbiotic mutualistic relationship between special soil fungi and fine plant roots; it is neither the fungus nor the root, but rather the structure formed from these two partners (Muchovej, R. M. "Importance of Mycorrhizae for Agricultural Crops" Florida Cooperative Extension Service Bulletin SS-AGR-170 (2001)). Vesicular arbuscular mycorrhiza is a type of mycorrhiza in which the fungus penetrates the cortical cells of the roots of a vascular plant. Vesicular arbuscular mycorrhizae are characterized by the formation of unique structures such as arbuscles and vesicles by fungi of the phylum Glomeromycota. These fungi help plants capture water and nutrients such as phosphorus and micronutrients from the soil. This symbiosis is a highly evolved mutualistic relationship between fungi and plants, the most prevalent plant symbiosis known (Simon, L. et al. "Origin and diversification of endomycorrhizal fungi and coincidence with vascular land plants" Nature 363:67-69 (1993)).

Vesicular arbuscular mycofrhizae are known to occur in approximately 80% of vascular plant families, including agriculturally important crops (Schussler, A. et al., "A new fungal phylum, the Glomeromycota: phylogeny and evolution" Mycological Research 105(12):1416 (2001)). Over the past 40 years, advances in mycorrhizal fungal physiology and ecology have led to applications of VAM fungi to improve ecosystems and production agriculture. One such application to increase the contribution of this symbiosis in annual crops is to maximize the activity of indigenous fungi through use of flavonoids to stimulate vesicular arbuscular mycorrhizal growth (Siqueira, J. O. et al., "VA-mycorrhizae and mycorrhiza stimulating isoflavonoid compounds reduce herbicide injury" Plant and Soil 134:233-242 (1991); Siqueira, J. O. et al., "Stimulation of vesicular-arbuscular mycorrhiza forma-tion and growth of white clover by flavonoid compounds" New Phytologist 118:87-93 (1991)).

Flavonoids constitute a broad class of secondary metabolites produced by plants and are commonly found in roots, seeds and various plant organs (Graham, T. L. "Flavonoid and isoflavonoid distribution in developing soybean seedling tissues and in seed and root exudates" Plant Physiology 95(2): 594-603 (1991)). One such flavonoid isolated from clover roots grown under phosphate stress conditions was identified and characterized as formononetin (4'-methoxy, 7-hydroxy isoflavone) (Nair, M. G. et al., "Isolation and identification of vesicular-arbuscular mycorrhiza-stimulatory compounds form clover (Trifolium repens) roots" Applied and Environmental Microbiology 52(2):434-439 (1991)). Various studies have demonstrated formononetin stimulates root colonization and/or hyphal formation and growth of vesicular arbuscular mycorrhizae when applied to plants at concentrations of 4-5 mg/L (Nair, M. G. et al. "Isolation and identification of vesicular-arbuscular mycorrhiza-stimulatory compounds form clover (Trifolium repens) roots" Applied and Environmental Microbiology 52(2):434-439 (1991); Siqueira, J. O. et al. "VA-mycorrhizae and mycorrhiza stimulating isoflavonoid compounds reduce herbicide injury" Plant and Soil 134:233-242 (1991); Siqueira, J. O., "Stimulation of vesicular-arbuscular mycorrhiza formation and growth of white clover by flavonoid compounds" New Phytologist 118:87-93 (1991); Baptista, M. J. & J. O. Siqueira "Effect of flavonoids on spore germination and a symbiotic growth of the arbuscular mycorrhizal fungus Gigaspora gigantea" Brazilian Journal of Plant Physiology 6(2):127-134 (1994); Koide, R. T, et al. "Strategies for mycorrhizal inoculation of six annual bedding plant species" HortScience 34(7):1217-1220 (1999); Davies, F. T. et al., "Influence of a flavonoid (formononetin) on mycorrhizal activity and potato crop productivity in the highlands of Peru" Scientia Horticulturae 106:318-329 (2005); Fries, L. L. M. "Influence of phosphorus and formononetin on isozyme expression in the Zea mays-Glomus intraradices symbiosis" Physiologia Plantarum 103:172-180 (1998); Ozan, A., et al. "Isozyme activity of developing Trifolium-Glomus mycorrhiza and associated effects of the isoflavone formononetin" Allelopathy Journal 3(2):217-228 (1996); Da Silva, J. P. & Siqueira, J. O. "Soil-applied synthetic formononetin stimulates arbuscular mycorrhizal formation in corn and soybean" Brazilian Journal of Plant Physiology 9(1):35-41 (1997); Da Silva, J. P. & Siqueira, J. O. "Mycorrhizal colonization and growth of soybean influenced by different fungal species and application of the isoflavonoid formononetin" Pesquisa Agropecuaria Brasileira 33(6):953-959 (1998). Additionally, various studies with formononetin have found significant increases in plant growth and biomass (Siqueira, J. O., et al. "Stimulation of vesicular-arbuscular mycorrhiza formation and growth of white clover by flavonoid compounds" New Phytologist 118: 87-93 (1991); Davies, F. T. "Influence of arbuscular mycorrhizae indigenous to Peru and a flavonoid on growth, yield, and leaf elemental concentration of 'Yungay' potatoes" HortScience 40(2):381-385) (2005); and reduced plant disease (Elmer, W. "Influence of formononetin and NaCl on mycorrhizal colonization and Fusarium crown and root rot of asparagus" Plant Disease 86(12):1318-1324 (2002)). The chemical name for formononetin is 4'-methoxy, 7-hydroxy isoflavone (CAS# 485-72-3).

U.S. Pat. Nos. 5,002,603; 5,085,682; and 5,125,955 report the use of formononetin, an isoflavonoid, as a stimulant for the growth of vesicular arbuscular mycorrhizal fungi ("VAM fungi") on roots of plants forming the beneficial mycorrhizal association. U.S. Pat. No. 5,691,275 reports the use of alkali metal formononetinate as a stimulant for the growth of VAM fungi. VAM fungi allow improved plant growth for many plant species by increasing nutrient and water uptake, synthesis of growth-promoting substances, drought tolerance, salinity and transplant shock tolerance, and interaction with other beneficial microorganisms. (Turk, M. A., et al., "Significance of Mycorrhizae" *World J. of Agricultural Sci.* 2(1): 16-20 (2006)).

A number of fungicides are available for agricultural and horticultural use. These include, for example, those listed in Table 1, which was obtained in part from Sweets, L., "Soybean Seed Treatment Fungicides," *Integrated Pest & Crop Management Newsletter* (Univ. of Missouri-Columbia) 16(1) (Jan. 20, 2006) and in part from University of Missouri Extension, "Disease Management—Corn" 2005 *Missouri Pest Management Guide: Corn, Soybean, Winter Wheat*; and University of Missouri Extension, M171: 2007 *Missouri Pest Management Guide: Corn, Grain Sorghum, Soybean, Winter Wheat* and in part from personal knowledge and experience of the inventors. Although these articles focus on soybean, corn and winter wheat fungicides, those fungicides may have uses as seed treatments in many other seed crops as well.

TABLE 1

| Active Ingredient | Examples of Product Trade Names (Company) |
| --- | --- |
| metalaxyl | Allegiance Dry (Trace Chemicals LLC) |
|  | Allegiance-FL (Gustafson LLC) |
|  | Allegiance-LS (Gustafson LLC) |
| mefenoxam | Apron XL LS (Syngenta) |
| azoxystrobin | Protege FL (Gustafson LLC) |
|  | Dynasty (Syngenta) |
| captan | Bean Guard (Trace Chemicals LLC.) |
|  | Captan 30-DD (Gustafson LLC) |
|  | Captan 400 (Gustafson LLC) |
|  | Captan 400 C (Gustafson LLC) |
|  | Enhance (Trace Chemicals LLC) |
|  | HiMoly/Captan-D (Trace Chemicals LLC) |
|  | Rival Flowable (Gustafson LLC) |
|  | Vitavax M DC (Helena) |
| carboxin | Bean Guard (Trace Chemicals LLC) |
|  | Enhance (Trace Chemicals LLC) |
|  | Kernel Guard Supreme (Trace Chemicals LLC) |
|  | RTU-Vitavax-Thiram (Gustafson LLC) |
|  | Vitaflo-280 (Gustafson LLC) |
|  | Vitavax CT (Helena) |
|  | Vitavax M DC (Helena) |
|  | Vitavax M (Helena) |
|  | Vitavax-PCNB (Gustafson LLC) |
|  | Vitavax T-L (Trace Chemicals LLC) |
|  | Vitavax-200 (Gustafson LLC) |
|  | Vitavax-34 (Gustafson LLC) |
| fludioxonil | Maxim 4FS (Syngenta) |
| mancozeb | Dithane DF Rainshield (Dow AgroSciences) |
|  | Dithane F-45 Rainshield (Dow AgroSciences) |
|  | Dithane M45 (Dow AgroSciences) |
|  | Manzate 75 DF (Griffin LLC) |
|  | Manzate 80 WP (Griffin LLC) |
|  | Manzate Flowable (Griffin LLC) |
|  | Penncozeb 75 DF (Cerexagri) |
|  | Penncozeb 80 WP (Cerexagri) |
| maneb | Manex (Griffin LLC) |
| PCNB | Rival Flowable (Gustafson LLC) |
|  | RTU-PCNB (Gustafson LLC) |
|  | Vitavax-PCNB (Gustafson LLC) |
| TBZ (thiabendazole) | LSP (Gustafson LLC) |
|  | Rival Flowable (Gustafson LLC) |
|  | RTU Flowable (Gustafson LLC) |
| thiram | Protector-D (Trace Chemicals LLC) |
|  | Protector-L (Trace Chemicals LLC) |
|  | RTU Flowable (Gustafson LLC) |
|  | RTU-Vitavax-Thiram (Gustafson LLC) |
|  | Triple Noctin L (Trace Chemicals LLC) |
|  | 42-S Thiram (Gustafson LLC) |
|  | Vitaflo-280 (Gustafson LLC) |
|  | Vitavax CT (Helena) |
|  | Vitavax M (Helena) |
|  | Vitavax T-L (Trace Chemicals LLC) |
|  | Vitavax-200 (Gustafson LLC) |
| trifloxystrobin | Trilex (Gustafson LLC) |
| fosetyl Al | Aliette Super (Bayer CropScience) |
| difenoconazole | Dividend (Syngenta) |
| tebuconazole | Raxil T (Bayer CropScience) |
| *Bacillus subtilis* | Kodiak Concentrate Biological Fungicide (Gustafson LLC) |
|  | Kodiak Flowable Biological Fungicide (Gustafson LLC) |
|  | Kodiak HB (Trace Chemicals LLC) |

TABLE 1-continued

| Active Ingredient | Examples of Product Trade Names (Company) |
| --- | --- |
| triadimenol | Baytan 30 (Gustafson LLC) |
| difenoconazole + mefenoxam | |
| azoxystrobin + metalaxyl | SoyGard (Gustafson LLC) |
| captan + carboxin + metalaxyl | Bean Guard Allegiance (Trace Chemicals LLC) |
| captan + diazinon | Captan-Diazinon Seed Treater (Trace Chemicals LLC) |
| captan + lindane | Sorghum Guard (Trace Chemicals LLC) |
| captan + diazinon + lindane | Kernel Guard (Trace Chemicals LLC) |
| captan + diazinon + lindane + metalaxyl | Agrox Premiere (Agriliance LLC) |
| captan + PCNB + thiabendazole + metalaxyl | Rival Pak (Gustafson LLC) |
| carboxin + maneb + lindane | Enhance Plus (Trace Chemicals LLC) |
| carboxin + diazinon + lindane | Germate Plus (Trace Chemicals LLC) |
| | Kickstart (Helena Chemical Corporation) |
| carboxin + metalaxyl + imidacloprid | Latitude (Gustafson LLC) |
| carboxin + PCNB + metalaxyl | Prevail (Trace Chemicals LLC) |
| carboxin + permethrin | Kernel Guard Supreme (Trace Chemicals LLC) |
| carboxin + thiram | Vitaflo-280 (Gustafson LLC) |
| carboxin + thiram + metalaxyl | Stiletto (Trace Chemicals LLC) |
| | Stiletto Pak (Trace Chemicals LLC) |
| chloroneb + mefenoxam | Catapult XL (Agriliance, LLC) |
| | Delta Coat XL (Agriliance, LLC) |
| chloroneb + metalaxyl | Catapult (Agriliance, LLC) |
| | Delta-Coat AD (Agriliance) |
| mancozeb + lindane | Grain Guard Plus (Trace Chemicals LLC) |
| mefenoxam + fludioxonil | ApronMAXX RFC (Syngenta) |
| | ApronMAXX RTA (Syngenta) |
| | ApronMAXX RTA + moly (Syngenta) |
| | Maxim XL (Syngenta) |
| | Warden RTA (Agriliance) |
| metalaxyl + imidacloprid | Concur (Agriliance LLC) |
| thiram + metalaxyl | Protector-L-Allegiance (Trace Chemicals LLC) |

Application of fungicides to plants may stimulate growth of plants by depressing growth of undesirable and/or pathogenic fungi, such as smuts, molds, rusts, and mildews. For example, a fungicide may be applied to suppress potato blight, wheat rust, wheat blight, wheat smut, or grape mildew.

One way that fungicide may be applied is as a seed treatment. This may be effective, for example, to suppress damage caused by seed decay, seedling blights, and root rots of certain seeds. Fungi that may cause this damage include, for example, species of the following genera: *Pythium, Phytophthora, Rhizoctonia, Fusarium, Verticillium* and *Macrophomina*.

A fungicidal effect may also be achieved by providing a seed that has been genetically engineered to produce a protein that is able to reduce the growth of undesirable and/or pathogenic fungi. Such genetically engineered organisms are reported, for example, in Herrera-Estrella, L. & Simpson, J., "Genetically Engineered Resistance to Bacterial and Fungal Pathogens" *World J. of Micro. & Biotech*. 11(4): 383-392 (2004) and in U.S. Pat. No. 7,098,378, to Sainz, et al. Both of the foregoing are incorporated by reference herein.

Rarely, fungicides that may be applied to reduce, suppress or eliminate deleterious fungi may also have an adverse effect on growth of beneficial VAM fungi. For example, application of the fungicide pentachloronitrobenzene (PCNB) has been reported to decreased VAM-infected root length of oats (*Avena sativa*), thereby decreasing phosphorus uptake. (Gnekow, M. A. & Marschner, H., "Influence of the Fungicide Pentachloronitrobenzene on VA-mycorrhizal and Total Root Length and Phosphorus Uptake of Oats" *Plant & Soil* 114: 91-98 (1989)). Application of the fungicide chlorothalonil has been reported to decrease mycorrhizal colonization, phosphorus concentration, and dry matter yields of *Leucaena leucocephala*. (Azis, T., et al. "Inhibition of Mycorrhizal Symbiosis in Leucaena leucocephala by chlorothalonil" *Plant & Soil* 131(1): 47-52 (1991)).

Growth of the vesicular arbuscular mycorrhizal fungus *Glomus mosseae* has been reported to be affected by application of the fungicide benomyl. (Chiocchio, V., et al. "Effect of the Fungicide Benomyl on Spore Germination and Hyphal Length of the Arbuscular Mycorrhizal Fungus *Glomus mosseae*" *Int'l Microbiol*. 3:173-75 (2000)). VAM colonization of onion roots has also been reported to be depressed by application of fungicide. (Kough, J. L., et al. "Vesicular-arbuscular Mycorrhizal Fungi after Fungicide Applications" *New Phytol*. 106: 707-715 (1987)).

SUMMARY OF THE INVENTION

An embodiment of the invention provides a seed coating composition that enhances VAM-fungus growth while simultaneously depressing growth of one or more undesirable or pathogenic fungi. A further embodiment of the invention provides a seed bearing a coating composition that enhances VAM-fungus growth and depresses growth of one or more undesirable or pathogenic fungi. Yet another embodiment of the invention provides a seed bearing a coating composition that depresses growth of undesirable or pathogenic fungi without depressing growth and/or activity of VAM fungi. A further embodiment of the invention includes providing a coating on a seed that has been genetically modified to produce a protein that depresses growth of undesirable and/or pathogenic fungi; these coatings include a composition that enhances VAM-fungus growth and may include a composition that depresses growth of undesirable and/or pathogenic fungi, which may or may not be the same undesirable and/or pathogenic fungi that are depressed by proteins produced by the seed.

A further embodiment of the invention includes providing a coating on a seed that has been genetically modified to produce a plant that produces a protein that enhances growth of VAM-fungi; these coatings include a fungicide and may include a composition that enhances growth of VAM-fungi and that is the same or different as the VAM-fungi enhancing composition produced by the genetically modified seed and/or resulting plant.

Processes for providing coated seeds and processes for coating seeds are also provided herein. Compositions used in embodiments of the invention include a fungicide and at least one of an alkali metal formononetinate and formononetin.

DETAILED DESCRIPTION OF THE INVENTION

As used herein, the singular forms "an," "a," and "the" used in the specification and claims include both singular and plural unless the content clearly dictates otherwise. While specific embodiments and examples of the invention are described herein, one skilled in the art will recognize that various modifications may be made without departing from the spirit and scope of the present invention as defined in the appended claims.

Seed coating compositions of the invention preferably comprise a fungicide and at least one of an alkali metal formononetinate and formononetin. Other additives may also be present, as discussed below.

I. Compositions that Enhance VAM-Fungus Growth

A. Formononetin and Alkali Metal Formononetinates

Formononetin and Alkali Metal Formononetinates are contemplated as useful VAM-fungus growth enhancing compositions and are described herein. Formononetin is an isoflavonoid with the formula:

(I)

An alkali metal formononetinate is an isoflavonoid with the formula:

(II)

ALK may be lithium, sodium, potassium, rubidium, or cesium. Sodium and potassium are preferred due to cost considerations.

Alkali metal formononetinate in aqueous solution (including, for example, in soil moisture or in suspension) changes to the acid form, formononetin.

B. Hesperetin

Hesperetin is another useful VAM-fungus growth enhancing composition. Hesperetin has the structure:

(III)

Hesperetin properties are reported, for example, in U.S. Pat. No. 6,831,098, and in Dong, C. J., et al. "Impact of Hesperitin on Infection Hyphal Growth and Enzyme Activity of AM Fungus" *Acta Pedologica Sinica* 43(3): 473-77 (2006); Dong, C. J., et al. "Effect of Flavonoids on AM Fungi and Mycorrhizal Plant" *Mycosystema* 23(2): 294-300 (2004); and Dong, C. J. & Zhao, B., "Interaction between AM Fungi and Rhizobium and Effects of Flavonoids on It" *Yingyong Shengtai Xuebao* 15(9): 1585-1588 (2004).

C. Isoflavones and Isoflavonoids

Isoflavones (isoflavonoids) may also be useful as VAM-fungus growth enhancing compositions. Isoflavones are compounds having a 3-phenylchromen-4-one backbone. Some isoflavones include, for example, but are not limited to genistein, daidzein, and glycitein.

II. Fungicides

A variety of fungicides may be used in embodiments of the invention. They include, for example, those classified and listed by the Fungicide Resistance Action Committee (FRAC), FRAC CODE LIST 1: *Fungicides sorted by FRAC Code*, December 2006. A summary of this list including FRAC Group Code, FRAC Group Name and FRAC Chemical Group or Class is presented below together with additions based on the personal knowledge and experience of the inventors.

1. Methyl benzimidazole carbamates (MBC): e.g. benzimidazoles, thiophanates
2. Dicarboximides
3. Demethylation inhibitors (DMI) (SBI: Class I): e.g. imidazoles, piperazines, pyridines, pyrimidines, triazoles
4. Phenylamides (PA): e.g. acylalanines, oxazolidinones, butyrolactones
5. Amines (SBI: Class II): e.g. morpholines, piperidines, spiroketalamines 6. Phosphoro-thiolates and Dithiolanes
7. Carboxamides: e.g. benzamides, furan carboxamides, oxathiin carboxamides, thiazole carboxamides, pyrazole carboxamides, pyridine carboxamides
8. Hydroxy-(2-amino-) pyrimidines
9. Anilino-pyrimidines (AP)
10. N-phenyl carbamates
11. Quinone outside inhibitors (QoI): e.g. methoxyacrylates, methoxy-carbamates, oximino acetates, oximino-acetamides, oxazolidine-diones, dihydro-dioxazines, imidazolinones, benzyl-carbamates
12. Phenylpyrroles
13. Quinolines
14. Aromatic hydrocarbons (AH) and Heteroaromatics I: e.g. 1,2,4-thiadiazoles
15. Cinnamic acids
16.1. Melanin biosynthesis inhibitors-reductase (MBI-R): e.g. isobenzofuiranone, pyrroloquinolinone, triazolobenzo-thiazole
16.2. Melanin biosynthesis inhibitors-dehydratase (MBI-D): e.g. cyclopropane-carboxamide, carboxamide, propionamide
17. Hydroxyanilides (SBI: Class III)
18. Hydroxyanilides (SBI: Class IV): e.g. thiocarbamates, allylamines
19. Polyoxins: e.g. peptidyl pyrimidine nucleoside
20. Phenylureas
21. Quinone inside inhibitors (QiI): e.g. cyanoimidazole, sulfamoyl-triazoles
22. Benzamides: e.g. toluamides
23. to 26. Antibiotics: e.g. enopyranuronic acid, hexopyranosyl, streptomycin, validamycin
27. Cyanoacetamide-oximes
28. Carbamates
29. Dinitrophenyl crotonates; Pyrimidinone-hydrazones and 2,6-dinitro-anilines
30. Organo tin compounds: e.g. tri phenyl tin compounds
31. Carboxylic acids
32. Heteroaromatics II: e.g. isoxazoles, isothiazolones
33. Phosphonates: e.g. ethyl phosphonates, phosphorous acid and salts
34. Phthalamic acids
35. Benzotriazines
36. Benzene-sulfonamides
37. Pyridazinones
38. Thiophene-carboxamides
39. Pyrimidinamides
40. CAA-fungicides (Carboxylic Acid Amides): e.g. cinnamic acid amides, valinamide carbamates, mandelic acid amides
41. Tetracycline
42. Thiocarbamate
43. Benzamides: e.g. acylpicolides

| Code P. | Host plant defense inducers: e.g. benzo-thiadiazole BTH, benzisothiazole, thiadiazole-carboxamides, harpin proteins |
|---|---|
| Code U. | Unclassified materials: e.g. thiazole carboxamide, phenyl-acetamide, quinazolinone, benzophenone |
| Code M. | Multi-site contact materials: e.g. copper salts, sulfur, dithiocarbamates and relatives, phthalimides, chloronitriles (phthalonitriles), sulphamides, guanidines, triazines, quinones (anthraquinones) |
| Code N. | Non-classified materials: e.g. mineral oils, organic oils, potassium bicarbonate, biological materials |

Those skilled in the art will recognize that use of other fungicides is also possible in various embodiments of the invention, and failure to list a particular fungicide or fungicidal class herein does not imply limitation of the claims. Fungicides that might otherwise not be used with compositions that enhance VAM fungal growth because they depress the growth of VAM fungi may also be used in embodiments of the invention; in such a case the benefit of the invention is that the deleterious effect of such fungicides on the VAM fungus may be reduced. These fungicides may include, for example, pentachloronitrobenzene, chlorothalonil, and benomyl.

Some embodiments of the invention include one or more fungicides selected from the group including benomyl, 2-(thiocyanatomethylthio)-1,3-benzothiazole, carbendazim, fuberidazole, thiabendazole, thiophanate, thiophanate-methyl, chlozolinate, iprodione, procymidone, vinclozolin, imazalil, oxpoconazole, pefurazoate, prochloraz, triflumizole, triforine, pyrifenox, fenarimol, nuarimol, azaconazole, bitertanol, bromuconazole, cyproconazole, difenoconazole, diniconazole, epoxiconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimefon, triadimenol, triticonazole, benalaxyl, furalaxyl, metalaxyl, metalaxyl-M (mefenoxam), oxadixyl, ofurace, aldimorph, dodemorph, fenpropimorph, tridemorph, fenpropidin, piperalin, spiroxamine, edifenphos, iprobenfos, (IBP), pyrazophos, isoprothiolane, benodanil, flutolanil, mepronil, fenfuram, carboxin, oxycarboxin, thifluzamide, furametpyr, penthiopyrad, boscalid, bupirimate, dimethirimol, ethirimol, cyprodinil, mepanipyrim, pyrimethanil, diethofencarb, azoxystrobin, strobilurins, enestrobin, picoxystrobin, pyraclostrobin, kresoxim-methyl, trifloxystrobin, dimoxystrobin, metominostrobin, orysastrobin, famoxadone, fluoxastrobin, fenamidone, pyribencarb, fenpiclonil, fludioxonil, quinoxyfen, biphenyl, chloroneb, dicloran, quintozene, (PCNB), tecnazene, (TCNB), tolclofos-methyl, etridiazole, ethazole, fthalide, pyroquilon, triclazole, carpropamid, diclocymet, fenoxanil, fenhexamid, pyributicarb, naftifine, terbinafine, polyoxin, pencycuron, cyazofamid, amisulbrom, zoxamide, blasticidin-S, kasugamycin, streptomycin, validamycin, cymoxanil, iodocarb, propamocarb, prothiocarb, binapacryl, dinocap, ferimzone, fluazinam, fentin acetate, fentin chloride, fentin hydroxide, oxolinic acid, hymexazole, octhilinone, fosetyl-Al, phosphorous acid and salts, teclofthalam, triazoxide, flusulfamide, diclomezine, silthiofam, diflumetorim, dimethomorph, flumorph, benthiavalicarb, iprovalicarb, valiphenal, mandipropamid, oxytetracycline, methasulfocarb, fluopicolide, acibenzolar-S-methyl, probenazole, tiadinil, isotianil, ethaboxam, cyflufenamid, proquinazid, metrafenone, copper (different, salts), sulphur, ferbam, mancozeb, maneb, metiram, propineb, thiram, zineb, ziram, captan, captafol, folpet, chlorothalonil, dichlofluanid, tolylfluanid, dodine, guazatine, iminoctadine, anilazine, dithianon, mineral oils, organic oils, potassium bicarbonate, tridemorph anilinopyrimidines, antibiotics, cycloheximid, griseofulvin, dinitroconazole, etridazole, perfurazoate, 5-Chloro-7-(4-methyl-piperidin-1-yl)-6-(2,4,6-trifluoro-phenyl)-[1,2,4]triazolo[1,5-a]pyrimidine, 2-Butoxy-6-iodo-3-propyl-chromen-4-one, 3-(3-Bromo-6-fluoro-2-methyl-indole-1-sulfonyl)-[1,2,4]triazole-1-sulfonic acid dimethylamide, nabam, metam, polycarbamate, dazomet, 3-[5-(4-Chloro-phenyl)-2, 3-dimethyl-isoxazolidin-3-yl]-pyridine, Bordeaux mixture, copper acetate, copper hydroxide, copper oxychloride, basic copper sulfate, nitrophenyl derivatives, dinobuton, nitrophthalisopropyl phenylpyrroles, sulfur, sulfur organometallic compounds, phthalide, toloclofos-methyl, N-(2-{4-[3-(4-Chloro-phenyl)-prop-2-ynyloxy]-3-methoxy-phenyl}-ethyl)-2- methanesulfonylamino-3-methyl-butyramide, N-(2-{4-[3-(4-Chloro-phenyl)-prop-2-ynyloxy]-3-methoxy-phenyl}-ethyl)-2-ethanesulfonylamino-3-methyl-butyramide; 3,4-Dichloro-isothiazole-5-carboxylic acid (2-cyano-phenyl)-amide, flubenthiavalicarb, 3-(4-Chloro-phenyl)-3-(2-isopropoxycarbonylamino-3-methyl-butyrylamino)-propionic acid methyl ester, {2-Chloro-5-[1-(6-methyl-pyridin-2-ylmethoxyimino)-ethyl]-benzyl}-carbamic acid methyl ester, {2-Chloro-5-[1-(3-methyl-benzyioxyimino)-ethyl]-benzyl}-carbamic acid methyl ester, hexachlorbenzene amides of following formula in which X is CHF2 or CH3; and R1, R2 are independently from each other halogen, methyl or halomethyl; enestroburin, sulfenic acid derivatives, cinnemamides and analogs such as, flumetover amide fungicides such as cyclofenamid or (Z)-N-[a-(cyclopropyl-methoxyimino)-2,3-difluoro-6-(difluoromethoxy) benzyl]-2-phenylacetamide; thiabendozole, and triffumizole.

Preferred embodiments of the invention include one or more of the fungicides in Table 2.

TABLE 2

| Active ingredient | CAS No. | EPA-PC Code |
|---|---|---|
| Chemical: | | |
| Azoxystrobin | 131860-33-8 | 128810 |
| Benomyl | 17804-35-2 | 099101 |
| Captan | 133-06-2 | 081301 |
| Carbendazim | 10605-21-7 | 128872 |
| Carboxamide/Anilide | 188425-85-6 | 128008 |
| Carboxin | 5234-68-4 | 090201 |
| Chloroneb | 2675-77-6 | 027301 |
| Chlorothalonil | 1897-45-6 | 081901 |
| Copper (and salts) | 7440-50-8 (and various) | 022501 (and various) |
| Dicloran | 99-30-9 | 031301 |
| Difenoconazole | 119446-68-3 | 128847 |
| Ethazole/Etridiazole | 2593-15-9 | 084701 |
| Fenpropimorph | 67306-03-0/67564-91-4 | 121402 |
| Fludioxonil | 131341-86-1 | 071503 |
| Fluoxastrobin | 361377-29-9 | 128869 |
| Fluquinconazole | 136426-54-5 | — |
| Flutriafol | 76674-21-0 | 128940 |
| Fosetyl Al | 39148-24-8 | 123301 |
| Harpin proteins | — | 006477/006506 |
| Hexaconazole | 79983-71-4 | 128925 |
| Hymexazole | 10004-44-1 | 129107 |
| Imazalil | 35554-44-0 | 111901 |
| Ipconazole | 125225-28-7 | 125618 |
| Iprodione | 36734-19-7 | 109801 |
| Kasugamycin | 19408-46-9/6980-18-3 | 230001 |
| Mancozeb | 8018-01-7 | 014504 |
| Maneb | 12427-38-2 | 014505 |
| Mefenoxam | 70630-17-0 | 113502 |
| Metalaxyl | 57837-19-1 | 113501 |
| Myclobutanil | 88671-89-0 | 128857 |
| Oxadixyl | 77732-09-3 | 126701 |
| PCNB | 82-68-8 | 056502 |
| Phosphorous acid | 13598-36-2 | 076002 |
| Propiconazole | 60207-90-1 | 122101 |
| Prothiocarb | 19622-19-6 | — |
| Prothioconazole | 178928-70-6 | 113961 |
| Pyraclostrobin | 175013-18-0 | 099100 |
| Silthiofam | 175217-20-6 | — |
| Streptomycin sulfate | 3810-74-0 | 006310 |
| Strobilurins - other | various | various |
| Sulfur | 7704-34-9 | 077501 |
| TBZ (thiabendazole) | 148-79-8 | 060101 |
| TCMTB | 21564-17-0 | 035603 |
| Tebuconazole | 107534-96-3 | 128997 |
| Tetramethylthiuram disulfide (Thiram) | 137-26-8 | 079801 |
| Thiophanate methyl and ethyl | 23564-05-8 | 102001 |
| Triadimenol | 55219-65-3 | 127201 |
| Triazoles - other | various | various |
| Trifloxystrobin | 141517-21-7 | 129112 |
| Triticonazole | 131983-72-7 | 125620 |
| Validamycin | 37248-47-8 | — |
| Zineb | 12122-67-7 | 014506 |
| Ziram | 137-30-4 | 034805 |
| Biological: | | |
| Bacillus species | — | — |
| Pseudomonas species | — | — |
| Streptomyces species | — | — |
| Trichoderma species | — | — |

III. Additional Additives

Seed-coating compositions of the invention may include biologically active ingredients other than formononetin, alkali metal formononetinate, or fungicides. Other active ingredients may include, but are not limited to, activators of plant genes, activators of plant systemic resistance, animal repellants, fertilizers, herbicides (where the seed is resistant to such herbicide) insecticides, (including but not limited to insecticides of the following classes: biological/fermentation products (such as avermectin; *Agrobacterium radiobacter*; *Bacillus* strains (including, for example, *Bacillus thuringiensis*); *Burkholderia cepacia*; *Pseudomonas* strains; *Trichoderma* strains; *Streptomyces* strains or spinosad), carbamates (such as aldicarb), chloronicotinyls (such as imidacloprid), diacylhydrazines (such as tebufenozide), neonicotinoids (such as clothianidin), nitroguanidines (such as nidinotefuran), organophosphates (such as diazinon), oxadiazine derivatives (such as indoxacarb), phenyl pyrazones (such as fiprinol), other pyrazones (such as tebufenpyrad), pyrethrins (such as pyrethrum), pyrrols (such as chlorfenapyr), synthetic pyrethroids (such as lambda cyhalothrin), thianicotinyls (such as thiamethoxam) and triazoles (such as triazamate), humectants, microbial inoculants, micronutrients, nematicides, osmotic agents, plant growth regulators, plant growth promoters and water absorbing gels.

In addition to biologically active ingredients, seed coating compositions may include many materials and additives that are either part of the formulations of the active ingredient or contribute to the handling qualities of the seed coating or its functionality and durability on the seed. An example of a coating additive is a coating polymer which binds the active ingredients to the seed. Seed-coating polymers may include, for example, but are not limited to, proteins, polysaccharides, polyesters, polyurethanes, polymers prepared from unsaturated monomers, and combinations thereof. One preferred seed coating polymer is the aqueous soluble seed coating polymer known as Seedkare® Polykote available from Becker Underwood Inc.

Other additives contributing to the handling qualities of the seed coating or its functionality and durability on the seed include but are not limited to surfactants, sequestering agents, plasticizers, colorants and dyes, brighteners, emulsifiers, flow agents, coalescing agents, defoaming agents, thickeners, waxes, bactericides, fillers, polymers, wetting agents and anti-freezing agents. The nature and action of such additives are well-known to those skilled in the art of formulation. Additives should not interfere with the action of the formononetin, alkali metal formononetinate, or fungicide or any other biologically active component as listed above.

Further information on seed treatment techniques, methodology, and additives may be found, for example, in the following publications, all of which are incorporated by reference herein: U.S. Patent Application Publication No.

20020115565, to Asrar, et al.; M. Newman, University of Tennessee at Knoxville, "Pesticide Applicator Training: Category 4, Seed Treatment"; Paulsrud, et al., Univ. of Illinois, "Oregon Pesticide Applicator Training Manual: Seed Treatment" 2001; Lipps, et al., Ohio State University Extension, Bulletin 639-98, "Seed Treatment for Agronomic Crops"; "Iowa Commercial Pesticide Applicator Manual: Seed Treatment" Iowa State Univ. Extension (February 1999); "Pesticide Application Training: Seed Treatment" Kansas State Univ. Ag. Experiment Station & Cooperative Extension Service (September 1998); "CSS 460/560 Seed Production: Seed Treatment" Oregon State Univ. Crop & Soil Science (undated); Mathre, et al. "Small Grain Cereal Seed Treatment," *Plant Health Instructor* (2006); "Seed Treatment: A Tool for Sustainable Agriculture" Seed Treatment and Environment Committee of the Int'l Seed Trade Federation (1999).

IV. Seeds

Virtually any seed is useful in embodiments of the invention. Preferred seeds are from plants that receive some benefit from being grown in the presence of VAM fungi, and particularly preferred seeds also have some agricultural value. Seeds may be selected from, for example, the row crops including corn, soybean, cotton, sunflower, peanuts and others; the cereal group including wheat, oats, barley, rice, sorghum and others; the forage and hay crops like alfalfa, the forage grasses and others; field crops like potatoes (meaning, in this case and in others like sweet potatoes, the "seed" tubers used to plant a crop, as well as true seed as used in breeding and propagation), tobacco, field beans and edible beans (such as pinto, navy and lima beans or other beans), peas, chickpeas, lentils and others, the vegetable crops such as tomato, cucurbits, peppers, onions, carrot, celery, lettuce and other non-brassica vegetable seeds, plus turf grasses, flower seeds and seeds of other ornamental species. Preferred seeds for use in the invention include corn, soybean, cotton, sunflower, alfalfa and wheat plus other small grains together with legumes, potatoes as defined and described above, non-brassicae vegetable seeds, turf and forage grass seeds and flower seeds.

It will be understood that "seed" as used throughout this disclosure and claims may be interpreted to be a seed of a native plant, hybrid plant, a transgenic or genetically modified plant, or a combination of the same. Those of skill in the art will recognize that most soybean, cotton, and corn seed currently in agricultural use is transgenic for one or more desirable traits. Therefore, it is to be expected that seeds coated according to the invention may bear a number of traits in addition to those discussed as having been conferred herein. Furthermore, it will be understood that when a seed is discussed herein as having been genetically modified to bear an additional trait (such as, for example, the ability to produce a fungicide and/or isoflavone), that modification does not foreclose previous or subsequent genetic modification of the seed for other traits.

In one embodiment of the invention, the seed has been engineered to include at least one heterologous gene encoding a protein that is fungicidally active; that is, that depresses the growth of an undesired or pathogenic fungus. The protein may be released by the seed and/or resulting plant at any time in the development of the plant.

When the seed to be coated encodes a protein that is fungicidally active, the coating may include both a fungicide and a composition that encourages VAM-fungus growth. The coating may include a composition that encourages VAM-fungus growth. Where the coating does not include a fungicide, the fungicidal function is performed as a result of the protein encoded by the heterologous gene.

When the coating does include a fungicide, the activity of the fungicide resulting from the protein may reduce growth of the same fungus as the fungicide in the coating or a different fungus as the fungicide in the coating. Examples of transgenic seeds including heterologous genes that encode proteins having fungicidal activity that may be coated according to the invention include but are not limited to those disclosed in U.S. Pat. No. 7,098,378; U.S. Patent Application Publication No. 20030172396; Balasubramanian, P., "Biotechnology in Plant Disease Control," Tamil Nadu Ag. Univ. (2005); Krishnamurthy, K., et al., "Wheat Puroindolines Enhance Fungal Disease Resistance in Transgenic Rice" *MPMI* 14(10):1255-1260 (2001); and AgrEvo Pty Ltd Press Release, "PR-93: Development of Fungal Disease Resistant Canola Cultivars" (1998), all of which are incorporated by reference herein.

In a further embodiment of the invention, the seed may include at least one heterologous gene encoding a protein that increases or enables the production of a composition that encourages VAM-fungus growth. For example, a transgenic plant grown from a transgenic seed may produce an enhanced amount of formononetin and/or hesperetin compared to a non-transgenic plant of the same species. In another embodiment, the formononetin and/or hesperetin production occurs constitutively. The formononetin and/or hesperetin may be produced at any stage of the life cycle of the plant, and is not limited to a single life cycle.

When the seed to be coated encodes a protein that increases or enables the production of a composition that encourages VAM-fungus growth, the coating may include both a fungicide and a composition that encourages VAM-fungus growth, or the coating may include a fungicide without a composition that encourages VAM-fungus growth. Where the coating does not include a composition that encourages VAM-fungus growth, that function is performed by the protein encoded by the heterologous gene. If the coating includes a composition that enhances VAM-fungus growth, it may be the same or different as the composition(s) produced by the transgenic seed and/or plant. Principles that may be helpful in understanding this embodiment of the invention are presented in Nair, M. G., et al., "Isolation and Identification of Vesicular-Arbuscular Mycorrhiza-Stimulatory Compounds from Clover (*Trifolium repens*) Roots" *App. & Env. Microbiol.* 57(2): 434-439 (1991); Deavours, B. E. & Dixon, R. A., "Metabolic Engineering of Isoflavonoid Biosynthesis in Alfalfa" *Plant Physiology* 138: 2245-2259 (2005), both of which are incorporated by reference herein.

Figure 1:
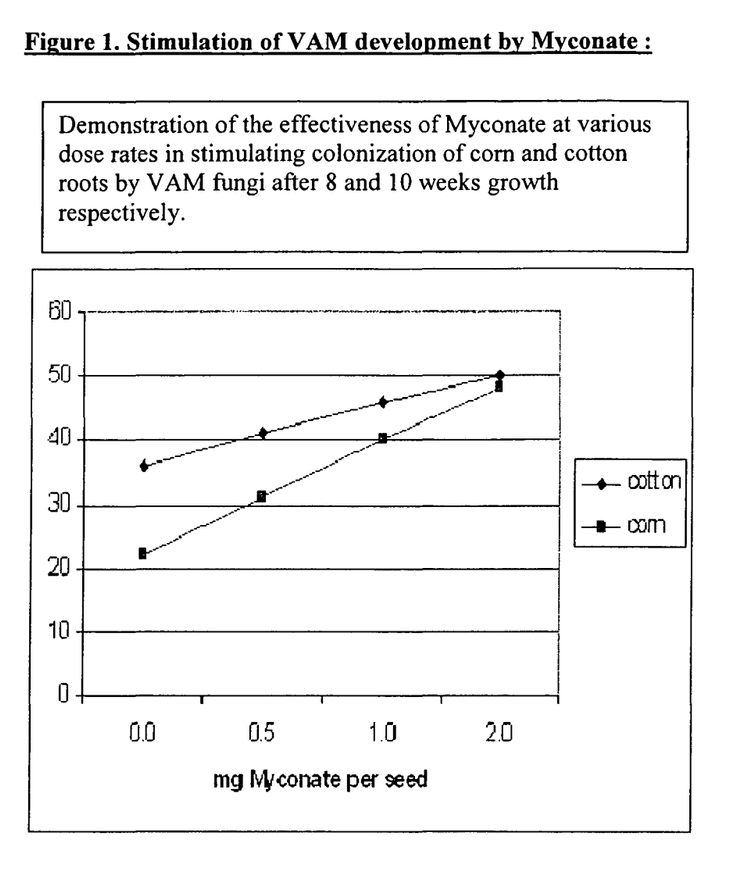
FIG. 1 shows the effectiveness of Myconate at various dose rates in stimulating colonization of corn and cotton roots by VAM fungi after 8 and 10 weeks growth respectively.
Figure 2:
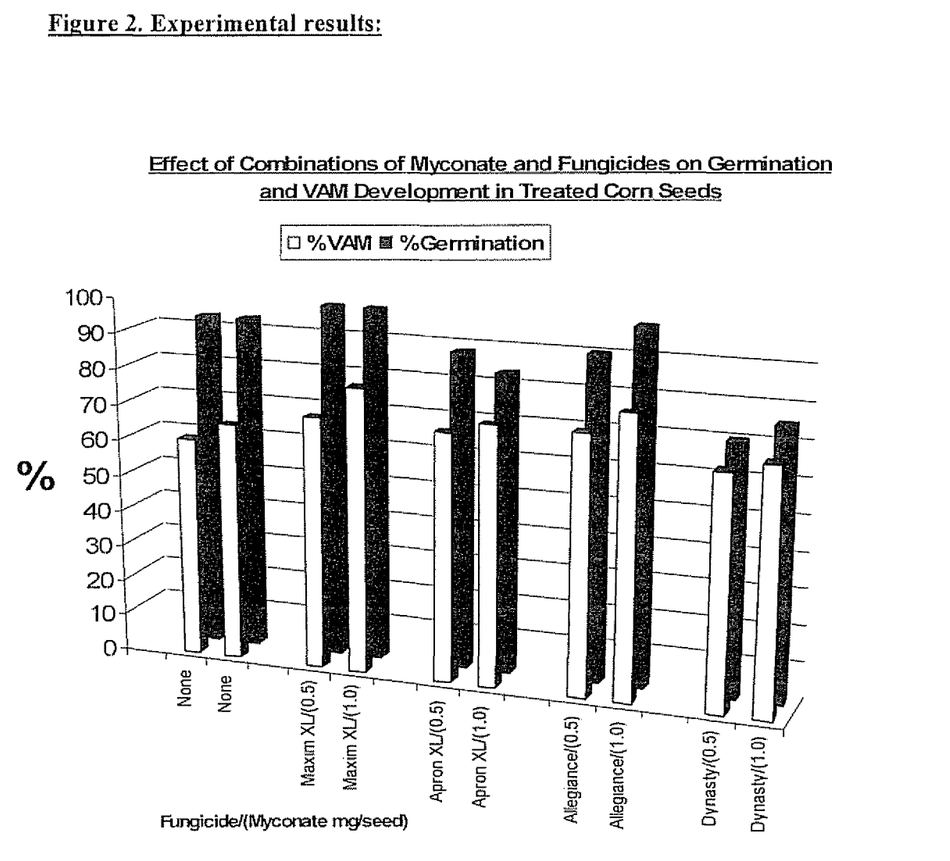
FIG. 2 shows experimental results of the effect of combinations of Myconate and fungicides on germination and VAM fungi development in treated corn seeds.
Figure 3:
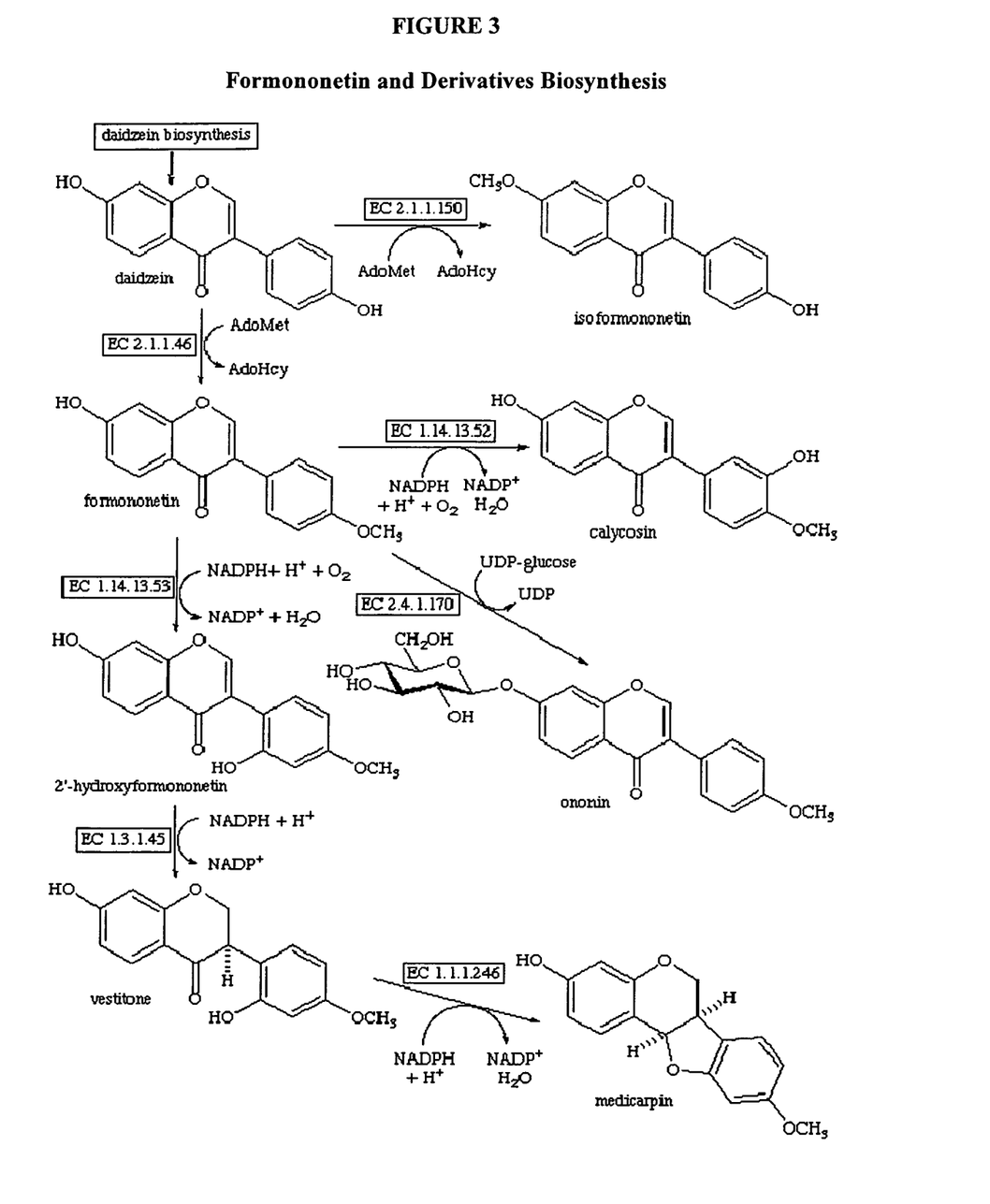
FIG. 3 shows the biosynthesis of formononetin and derivatives. The diagram is from International Union of Biochemistry and Molecular Biology, 2004.

Compositions that enhance VAM-fungus growth include, for example, formononetin, alkali formononetinate, and hesperetin. Seeds that produce one or more of these compounds may be contemplated by those skilled in the art with the benefit of this disclosure. Formononetin is an isoflavone. As reported in U.S. Pat. No. 6,146,668, isoflavones are widely distributed in the plant kingdom, but are found predominantly in legumes, with the richest sources being clovers and soybeans. Biosynthesis of formononetin and other isoflavenoids has been reported, as shown in FIG. 3.

Production of formononetin and other isoflavonoids in cell suspension cultures has been reported. Arias-Castro, C., et al., "The effect of cultural conditions on the accumulation of formononetin by suspension cultures of *Glycyrrhiza glabra*" *Plant Cell, Tissue & Organ Culture* 34(1): 0167-6857 (1993). Production of formononetin and other isoflavones in callus culture has also been reported. Mitsugu, K., et al., "Formation of Chalcones and Isoflavones by Callus Culture of *Glycyrrhiza uralensis* with Different Production Patterns" *Chem. & Pharm. Bulletin*, The Pharmaceutical Society of Japan 33(9): 3811-16 (1985); Fedoreyev, S. A., et al. "Isoflavonoid production by callus cultures of *Maackia amurensis" Fitoterapia* 71(4): 365-72 (2000); see also Jedinak, A., et al. "Approaches to Flavonoid Production in Plant Tissue Cultures" *Biologia, Bratislava* 59(6): 697-710 (2004).

Production of compounds related to formononetin has already been achieved. For example, genistein has been produced in the leaves of alfalfa. Deavours, B. E. & Dixon, R. A., "Metabolic Engineering of Isoflavonoid Biosynthesis in Alfalfa" *Plant Phys*. 138: 2245-59 (2005). Although not previously contemplated, the principles used in Deavours and elsewhere may be extended and modified to provide formononetin-producing and hesperetin-producing seeds that may be coated as set forth herein.

V. Ingredient Amounts

Those skilled in the art will recognize that the amount of fungicide and amount of form ononetin and/or alkali formononetinate that is used to coat a population of seeds will vary based on the size of the seed and the effective active rate of the fungicide, formononetin, and/or alkali formononetinate for that seed.

A typical amount of formononetin and/or alkali formononetinate for use in a coating of the invention is an amount that provides an effective treatment rate greater than about 6 grams of active ingredient per acre. For example, for corn the amount of formononetin effective to coat a number of seeds for planting one acre is about 15-25 grams. The amount of alkali formononetinate effective to coat a number of seeds for planting one acre of corn is about 24 grams.

Determine by experimentation or from published data the average number of seeds present in a 100 lbs quantity of the seed (a useful standard for corn is 175,000 seed per 100 lbs). Based on the required rate of Active per seed (0.8 mgs/seed) calculate the amount of Active required per 100 lbs of seed (0.8×(175,000/1000))=140 grams. Then based on the amount of Active present in the seed coating formulation (e.g. 35% w/w) calculate the amount of product required to be added to 100 lbs of seed (140/0.35=400 grams). Using the specific gravity of the formulation (in this example 1.1 grams per liter) one can express the required amount of product as a volume (in this case 363.6 mls or 12.3 fl. oz.). Calibrate the seed coating equipment to deliver this desired amount of product to 100 lbs of seed. For soybeans and wheat the equivalent calculation results in a use rate of 3.36 and 4.21 fl. oz. per 100 lbs seed respectively.

Seed treatment fungicides are available commercially with a recommended seed coating application rate. In one example, the Maxim XL fungicide (Syngenta), the recommended rate for seed treatment of field corn is expressed as 0.167 fl. oz. per 100 lbs of seed or, 0.075 fl. oz. per 80,000 seed count or, 0.009 mgs per seed. An example of a formulation for formononetin is shown in Table 3 together with the amount of each ingredient which would typically be applied to corn on a per seed, per 100 lbs of seed, per 80,000 seed count and a per acre basis (30,000 seed count). Also shown is the amount of fungicide applied in each instance.

TABLE 3

| Product: Myconate FS350 (350 grams Active per kg product) Application to Corn at 24 grams/acre or 0.8 mgs/seed. | | | | | | |
|---|---|---|---|---|---|---|
| Ingredients: | Comment: | Weight (%) | fl.oz. per 100 lbs seed | fl.oz. per 80k seed | mgs per seed | grams per acre |
| Formononetin | active | 35.00 | 4.30 | 1.97 | 0.80 | 24.00 |
| Yuccah | surfactant | 0.50 | 0.06 | 0.03 | 0.01 | 0.34 |
| Polykote | polymer | 12.50 | 1.54 | 0.70 | 0.29 | 8.57 |
| Sodium bicarbonate | pH adjustment | 0.39 | 0.05 | 0.02 | 0.01 | 0.27 |
| Acticide | biocide | 0.06 | 0.01 | 0.00 | 0.00 | 0.04 |
| Colorant | use indicator | 14.00 | 1.72 | 0.79 | 0.32 | 9.60 |
| Water | diluent | 37.55 | 4.62 | 2.11 | 0.86 | 25.75 |
| | Totals | 100.00 | 12.30 | 5.62 | 2.29 | 68.57 |
| Sp. Gravity: 1.1 grams per ml | | | | | | |
| Maxim XL (fungicide: follow use directions) | | | 0.167 | 0.075 | 0.009 | 0.27 |

The following calculation may be applied to determine the amount of formononetin and/or alkali formononetinate ("Active") to be applied per seed:

Corn: typical planting rate 30,000 seeds per acre, required Active rate per acre=24 grams; so required application rate is 0.8 mgs per seed.

Soybean: typical planting rate 150,000 seeds per acre, required Active rate per acre=24 grams; so required application rate is 0.16 mgs per seed.

Wheat and other small grain cereal crops like oats and barley: typical planting rate 1,000,000 seeds per acre, required Active rate per acre=32 grams; so required application rate is 0.032 mgs per seed.

Vegetables: Planting rates expressed as seeds per acre vary markedly, the required Active rate per acre=40 grams; so the application rate is adjusted to apply 40 grams Active evenly on the seed required to plant one acre.

The rate of application of product during seed treatment may be calculated as follows:

VI. Seed Application

Once the desired rates of application of Active and fungicide are known, both as amounts per 100 lbs seed, the materials can then be applied. The applications of the Active and fungicide and any other treatments may be made either successively, simultaneously or using a mixture of the Active formulation and the fungicidal formulation. Under successive applications the fungicide is preferably applied first (to allow rapid release of the Active from the outer coating layer into the soil) and then after the fungicidal seed coating is dry the seeds are re-coated with the Active product. Under simultaneous application the Active and the fungicidal treatments are applied at the same time using the same equipment but each product is delivered through separate pumps and delivery lines and do not mix until they meet the seed.

Under a product mix application the Active and fungicidal products are mixed together, with or without dilution as needed, and delivered together to the seed using one pump and delivery line. In combination methods, some components of the coating are applied successively, while others are applied simultaneously or in co-formulation. Before mixing the Active with any fungicidal product it is necessary through experimentation to determine that neither product has negative effects on the other in respect of physical, chemical or biological properties.

EXAMPLES

The following examples are intended to guide those skilled in the art in the practice of this invention. They should not be construed to limit the scope of the invention, which is defined by the claims.

Example 1

Laboratory Studies (2006)

Example 1 describes experimental studies carried out, in spring and summer of 2006 to evaluate the effects of different commercial fungicide seed coatings on VAM development in germinated corn seedlings in the presence and absence of alkali formononetinate. All corn seed coatings were done by Sub-Sahara International, Inc. (now owned by Becker Underwood Inc.) using standard coating procedures. The treater used was an RP-14 rotary seed coating machine manufactured by Sedpell in Canada. Successive applications were made with the fungicides being applied first according to the label instructions; then, when the seeds were dry they were over-coated with the alkali (potassium) formononetinate.

The listed fungicides were applied in the amounts given in Table 4. Fungicides were applied as a high viscosity, liquid suspension formulations according to the use directions on the respective labels.

TABLE 4

| Fungicide: | Application rate used: (grams a.i. per 100 lbs corn seed) | Range of use rates and comments |
|---|---|---|
| Maxim XL | 1.134 g fludioxonil plus 0.4536 g mefenoxam | Any recommended use rate for this material on the crop of interest |
| Apron XL LS | 0.904 g mefenoxam | Any recommended use rate for this material on the crop of interest |
| Allegiance LS | 3.816 g metalaxyl | Any recommended use rate this material on the crop of interest |
| Dynasty | 0.450 g azoxystrobin | Any recommended use rate for this material on the crop of interest |

The polymer coating used for the alkali formononetinate coating was Seedkare® Polykote. Seedkare® Polykote is a liquid polymer emulsion for seed coating (chemical name: acrylic polyvinyl alcohol copolymer). This polymer can be mixed at the treating plant with SEEDKARE® COLORANTS and SEEDKARE® LUSTER pigment to give the operator greater flexibility in varying rates of the components at a cost savings. It provides excellent binding capability and dust control when older powder seed treatment chemicals are used.

The alkali formononetinate was dissolved in water and Polykote added according to the following ratios by weight: water—70 parts; alkali formononetinate—45 parts; Polykote—20 parts.

Seed germination and VAM development tests were carried out in a greenhouse at the Formosa Agricultural and Environmental Research Center, LaWard, Tex.

Percent germination tests were preformed with 40 seed on moistened paper at 28 C°. after 2 days.

Percent VAM development was determined, within 3 weeks of treatment, on five, 6-week-old corn plants (from seeding) per treatment planted in sterile potting soil containing 95 spores of a 4 species VAM fungal cocktail at low P concentration. Originally 10 plants per treatment were installed in 30 ml Seedling® cells and after 10 days, 5 were transplanted into 1 liter containers. Results are as follows in Table 5:

TABLE 5

Seed germination and VAM development of corn seed coated with Seedcare ® Polykote polymer, alkali formononetinate, and different commercial seed coating fungicides applied at recommended rates. Alkali formononetinate was manufactured by SK Energy and Chemical, South Korea and delivered in early 2006.

| Fungicide | mg Alkali formononetinate/seed | % germination | % VAM |
|---|---|---|---|
| None | None | 92 | 54 |
| None | 0.5 | 93 | 61 |
|  | 1.0 | 93 | 66 |
| Maxim XL | 0.5 | 98 | 70 |
|  | 1.0 | 98 | 79 |
| Apron XL | 0.5 | 88 | 69 |
|  | 1.0 | 83 | 72 |
| Allegiance | 0.5 | 90 | 72 |
|  | 1.0 | 98 | 78 |
| Dynasty | 0.5 | 70 | 65 |
|  | 1.0 | 75 | 68 |

Seed Germination Seed germination was above 90% for all treatments except for those treated with Apron and Dynasty. Dynasty consistently depressed seed germination in this test. It appears that Maxim at both alkali formononetinate rates and Allegiance at 1.0 mg alkali formononetinate/seed improved seed germination from 93 to 98%. Overall seed germination was not affected by the low rate (87%) compared to the high rate (89%) of alkali formononetinate/seed.

VAM Development—The effects of the fungicides on VAM development were interesting. When compared to controls (no fungicides), all fungicides had a slight improvement effect on VAM development. There was also a consistent effect of alkali formononetinate rate on VAM development. The 1.0 mg alkali formononetinate/seed averaged 73% and the 0.5 mg alkali formononetinate averaged 67% VAM; with no alkali formononetin treatment the base VAM level was just 54%. The fact that fungicides themselves had some positive effects on VAM, though not so much as the alkali formononetin treatment is explainable in that removal of the pathogenic organisms may have removed any competitive effects that these were having on the VAM organisms.

The results indicate that the most commonly used commercial fungicides at recommended rates on seed did not depress VAM development on corn. Also, the high rate of alkali formononetinate (1 mg/seed) produced more VAM development than the lower rate (0.5 mg/seed).

Example 2

Laboratory Studies (2007)

In the study reported in Example 1 it was established that some commonly used commercial fungicides at recommended rates on seed did not inhibit the stimulatory effects of Myconate on VAM development of corn plants grown from seed treated with fungicides. Also, the higher rate of alkali formononetinate produced more VAM development than the lower rate.

Further studies were carried out in 2007 to determine firstly, if rates in excess of 1 mg/seed of potassium formononetinate in the presence of seed coating fungicides, produce even higher rates of VAM colonization than seen in the 2006 studies; and secondly to determine if the aqueous-insoluble acid formononetin performs in the same way as the potassium salt.

Methods: This study was conducted between February-April 2007 in a greenhouse at the Formosa Agricultural and Environmental Research Center using hybrid corn plants (*Zea mays* L.) var. Beck's Hybrids 5959 (HB) and Dow/Mycogen 2D675 (PG). The hybrid corn seed was purchased from commercial sources and was pre-treated with one of two fungicidal/insecticidal seed treatments. Variety HB was commercially treated with Beck's "SureGro" containing fludioxonil and mefenoxam fungicides; together with Agriliance Actellic 5E (a.i. pirimiphos-methyl) insecticide, according to label directions. Variety PG was commercially treated with Syngenta "Cruiser Extreme" (a.i. fludioxonil, mefenoxam and azoxystrobin fungicides plus thiamethoxam insecticide) according to label directions.

Subsequently, the corn seed was over-treated with one of two formulations of Myconate. One formulation contained 98% potassium formononetinate (kf) together with Polykote polymer; and the other, 100% acid formononetin (afP) together with Polykote polymer, wetting agent, colorant, and preservative. The kf treatments, 1 through 6 in Table 6, contained varying amounts of potassium formononetinate and were applied using a lab bench apparatus. The afP treatments, 18 and 19, were applied using commercial equipment. Treated HB seed received the kf treatment of potassium formononetinate at rates of 0.2 to 5.6 mg/seed. Treated PG seed received the afP treatment of formononetin at single rate of 0.8 mg/seed. The concentration of formononetin per seed was calculated by gravimetric measurement of the coating applied to the seed.

The controls for the kf treatments involved two seed samples, 7 and 8, both untreated with kf and one of these was also untreated with VAM spores. The control for the afP treatment was treated with afP but was not treated with VAM. The various treatments, including the addition of VAM spores to the growing medium prior to sowing for VAM development studies are described schematically in Table 6.

TABLE 6

| Treatment No. | Variety | Fungicide/Insecticidal Treatment | Second Polymer | Myconate (mg/seed) | VAM | No. of Replicates |
|---|---|---|---|---|---|---|
| 1 | BH | + | + | 0.2 kf | + | 5 |
| 2 | BH | + | + | 0.4 kf | + | 5 |
| 3 | BH | + | + | 0.8 kf | + | 5 |
| 4 | BH | + | + | 1.6 kf | + | 5 |
| 5 | BH | + | + | 4.0 kf | + | 5 |
| 6 | BH | + | + | 5.6 kf | + | 5 |
| 7 | BH | + | − | — | + | 10 |
| 8 | BH | + | − | — | − | 5 |
| 9 | PG | + | + | 0.8 afP | + | 5 |
| 10 | PG | + | + | 0.8 afP | − | 5 |

Seed Germination: The following method was used to determine seed germination. One hundred seeds from each treatment were individually sown in 30 ml cells of Speedling trays containing autoclaved Miraco-III potting mix. After watering, the trays were incubated at ambient temperatures (ca. 25° C.) under continuous illumination for 7 days. After 7 days, the germination rate and other pertinent observations were recorded. Seeds were considered germinated when they developed into normal size seedlings. Seeds that exhibited no emergence or that had emerged but were stunted, deformed and otherwise abnormal (such as having double or triple shoots) were considered ungerminated. Germination rate was calculated as the percentage of seed showing emergence of those essential structures that are indicative of the ability to produce a normal plant under favorable conditions.

Germination rates ranged from 89% to 99% for all experimental treatments (Table 7). Seeds used in this test were randomly selected; therefore rates represent actual germinability of seed in each experimental treatment. Myconate concentrations of 4.0 and 5.6 mg/seed (5 to 7 times the commercial rate) showed the lowest germination rates and produced a higher incidence of abnormal seedlings Seeds treated at 5.6 mg/seed grew slightly shorter with smaller leaf blades and were less uniform in size than seeds treated at lower concentrations. This difference disappeared after seedlings were transplanted to 1-liter cups containing sand-based medium and incubated in a greenhouse for a few weeks for the VAM development study.

Germination rates for seed treated with the commercial application rate of Myconate (0.8 mg/seed, 3 samples) ranged from 96% to 99%, which exceed the minimum 90% germination required for hybrid seed corn. For comparison, germination rates for untreated seed showed a similar range, 95% to 97%. At 2× commercial rate (1.6 mg/seed), germination rates also exceeded minimum standards. Thus, we conclude that Myconate treatment up to 1.6 mg/seed has no adverse affect on seed germinability.

TABLE 7

| Treatment No. | Myconate (mg/seed) | Description of seedlings per 100 seeds | | % Germination |
|---|---|---|---|---|
| | | No. Normal | No. Abnormal* | |
| 1 | 0.2 kf | 92 | 1 | 92 |
| 2 | 0.4 kf | 96 | 2 | 96 |
| 3 | 0.8 kf | 96 | 2 | 96 |
| 4 | 1.6 kf | 94 | 0 | 94 |
| 5 | 4.0 kf | 91 | 4 | 91 |
| 6 | 5.6 kf | 89 | 4 | 89 |
| 7 | — | 95 | 0 | 95 |
| 8 | — | 97 | 2 | 97 |
| 9 | 0.8 afP | 99 | 1 | 99 |
| 10 | 0.8 afP | 99 | 1 | 99 |

*Seedlings that appeared stunted, deformed or produced multiple shoots were classified as abnormal. Seeds from which they originated were counted as ungerminated.

The colonization rate of VAM fungi on corn roots was determined using methods commonly used to quantify vesicular arbuscular mycorrhiza (Kormanik PP and AC McGraw (1984) Quantification of vesicular-arbuscular mycorrhizae in plant roots. In N. C. Schenck (ed.) Methods and Principles of Mycorrhizal Research. American Phytopathological Society, St. Paul, Minn.; Phillips J M and D S Hayman (1970) Improved procedures for clearing roots and staining parasitic and vesicular-arbuscular mycorrhizal fungi for rapid assessment of infection. Trans. Br. Mycol. Soc. 55:158-160; Read D J, H K Koncheki and J Hodgson (1976) Vesicular-arbuscular mycorrhiza in natural vegetation systems. New Phytol. 77:641-653). Speedling tray cells (30 ml volume) were partially (⅔) filled with autoclaved Miraco-III potting mix and inoculated with 95 spores of VAM cocktail (Lot No.

12-14-04). The VAM cocktail contained spores of *Glomus etunicatum, Glomus clarum, Entrophospora columbiana* and *Glomus intraradices*. The cocktail was prepared by mixing dry-sieved (179 microns) spore preparations of *G. entunicatum, G. clarum* and *E. columbiana* with dry root pieces containing the intraradical spores of *G. intraradices*. Each fungal species was individually produced and processed using a pot culture technique. The cells were then filled with Miraco-III mix. After sowing, (one seed per cell, 9-20 seed per treatment), the trays were incubated under continuous light at room temperature. Ten days after sowing, five seedlings from each experimental treatment and 10 from two untreated controls (Treatments 7 and 8) were randomly selected and transplanted to 1-liter cups containing a sand-based medium. The cups were incubated in a greenhouse and a low phosphorus (P) nutrient solution (1.175 ppm) was applied to all treatments 1-2 times per week as needed to maintain proper soil moisture.

Four weeks after transplanting, five seedlings of the untreated control (Treatments 7) were examined for VAM development and found to exhibit slightly over 20% VAM colonization. On the following day, root samples from all remaining seedlings (5 seedlings per treatment) were collected and stored in a refrigerator (4-6° C.) for 5 days until processed. The root samples were washed, cleared and stained for VAM assessment according to procedures described by Phillips J M and D S Hayman (1970) Improved procedures for clearing roots and staining parasitic and vesicular-arbuscular mycorrhizal fungi for rapid assessment of infection. Trans. Br. Mycol. Soc. 55:158-160. Root samples were processed at the rate of 30-35 samples per day. Microscopic assessments of the stained roots for VAM colonization were performed using root-slide techniques described by Kormanik P P and A C McGraw (1984) Quantification of vesicular-arbuscular mycorrhizae in plant roots. In N. C. Schenck (ed.) Methods and Principles of Mycorrhizal Research. American Phytopathological Society, St. Paul, Minn.

Figure 4:
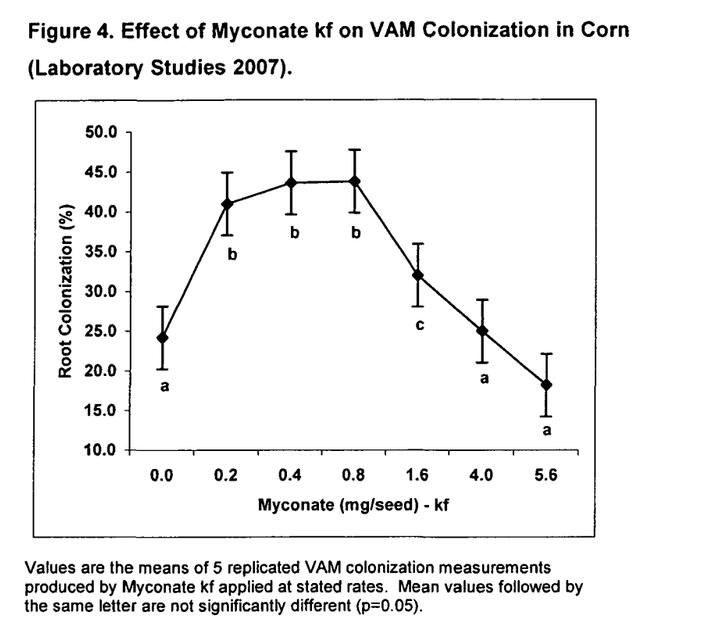
FIG. 4 shows a dose response curve for Myconate stimulation of VAM colonization of corn, from 2007 laboratory studies.

Table 8 reports the results for VAM colonization in these trials. Both the potassium formononetinate (kf) and acid formononetin (afP) increased VAM colonization by 81 and 105% respectively at the commercial use rate (0.8 mg/seed). VAM colonization under the three seed treatments with Myconate kf up to 0.8 mg/seed was increased by more than 69 to 81% over the untreated control; however, no linear dose effect was seen among these three treatments (FIG. 4). At 1.6 mg/seed, Myconate kf increased VAM colonization by approximately 30%, which shows a decline in dose response. At or above 4.0 mg/seed, Myconate kf decreased VAM colonization in these experiments. To our knowledge, this is the first published report of formononetin inhibiting VAM colonization; however the dose response observed here is typical for many materials applied to soils and plants.

No VAM development was found on uninoculated control plants (Treatments 8 and 10) indicating there was no contamination during the experiments. The untreated control plant (Treatments 7), which served as a positive VAM inoculation control without Myconate, exhibited 24.2% VAM colonization. The formononetin worked at least as well, or better, than the potassium formononetinate at the same rate.

TABLE 8

| Treatment No. | VAM | Myconate (mg/seed) | % Root colonization by VAM in 5 replicates | | | | | |
|---|---|---|---|---|---|---|---|---|
| | | | A | B | C | D | E | Mean (%) |
| 1 | + | 0.2 kf | 40 | 47 | 41 | 39 | 38 | 41.0 |
| 2 | + | 0.4 kf | 44 | 48 | 45 | 40 | 41 | 43.6 |
| 3 | + | 0.8 kf | 45 | 42 | 47 | 45 | 40 | 43.8 |
| 4 | + | 1.6 kf | 30 | 39 | 28 | 35 | 28 | 32.0 |
| 5 | + | 4.0 kf | 27 | 21 | 31 | 24 | 22 | 25.0 |
| 6 | + | 5.6 kf | 19 | 12 | 25 | 18 | 17 | 18.2 |
| 7 | + | — | 27 | 28 | 20 | 22 | 24 | 24.2 |
| 8 | − | — | 0 | 0 | 0 | 0 | 0 | 0 |
| 9 | + | 0.8 afP | 38 | 59 | 53 | 40 | 58 | 49.6 |
| 10 | − | 0.8 afP | 0 | 0 | 0 | 0 | 0 | 0 |

Conclusions: This study has shown that Myconate is neither detrimental to germination nor to VAM development unless applied at rates 5 to 7 times higher than the recommended commercial rate. These studies have also re-confirmed that Myconate retains its VAM stimulatory properties even when applied to seed which has a coating of one or more of a range of seed treatment fungicides.

Example 2

Field Studies

During 2005 and 2006 field studies were carried out to demonstrate firstly, that combinations of alkali metal formononetinate and/or formononetin with fungicides do not reduce germination in the field to levels below those observed for fungicides alone; and secondly, that the effect of VAM stimulation known to result from alkali formononetinate and/or formononetin treatments actually results in yield increases and is therefore of value to the farmer; and thirdly that this effect is not inhibited, reduced or negated by the presence of fungicides on seed treated with formononetin and/or alkali formononetinate.

These trials were carried out in Indiana and in this example seed of either corn or soybean was treated by a commercial seed treater operated by a well-respected seed company. The seed treatments were as shown in Table 10. The fungicide used on the corn seed was Maxim XL and those corn seeds receiving fungicides also received a simultaneously-applied protective insecticidal treatment, in this case Poncho 600 (a.i. clothianidin) applied at a rate of 0.25 mg active ingredient per seed (so-called "Poncho 250"). The fungicide used on the soybean seeds was a mixture of the four materials shown; the soybean seeds were not treated with an insecticide.

TABLE 10

| Treatment type: | Corn trial-2005 | Soybean trial-2005 | Corn trial-2006 |
|---|---|---|---|
| Untreated control | YES | YES | YES |
| Fungicide without Active | Maxim XL plus Poncho 250 insecticide | Maxim XL + PCNB + Apron XL + Thiram | Maxim XL plus Poncho 250 insecticide |
| Fungicide with Active | Maxim XL plus Poncho 250 insecticide | Maxim XL + PCNB + Apron XL + Thiram | Maxim XL plus Poncho 250 insecticide |

All of the commercially available fungicides and insecticides were applied according to the labeled recommendations and according to the directions for use provided.

In this case the Active used was the alkali (potassium) formononetinate and this was applied subsequently to treatment with the fungicides and insecticides after diluting in sufficient water to make a slurry which would flow through the treater.

The seed comprising the various treatments were sown in small replicated plots at several locations for each trial using a standard planter and planting a set number of rows for each treatment at each specific location. Standard agricultural practices were used throughout the growing season. Further details of the trial design and procedures are provided in Table 11.

TABLE 11

| Parameter | Corn trial-2005 | Soybean trial-2005 | Corn trial-2006 |
|---|---|---|---|
| No. of locations | 3 | 5 | 3 |
| Total no. of replicates | 5 | 7 | 5 |
| Date planted | 4/6 to 5/3, 2005 | 4/16 to 18, 2005 | 4/20 to 27, 2006 |
| Plot size | 2 or 4 × 30" rows | 6 × 15" rows | 2 × 30" rows |
| Tillage regime | Conventional and low-till | No till | Conventional and low-till |
| Seed population sown | 29k to 33.7k/acre depending on site | 156k/acre | 30k to 32.5k/acre depending on site |
| Rainfall April through August | 20.7" | 20.7" | 21.1" |
| Date harvested | 10/7 to 13, 2005 | 10/3 to 5, 2005 | 9/26 to 28, 2006 |

Following emergence and early establishment of the crops the number of emerged plants were counted and recorded to provide an estimate of germination and establishment. Then at harvest the yield of each plot was determined by weighing the harvested product in a standard crop weigh-wagon. The yields were adjusted to an equivalent moisture content throughout and calculated as bushels per acre. The results for stand establishment and yield are presented in Table 12, where the result for the plots with treated seeds are expressed as a percentage increase over that of the plots of untreated seed.

TABLE 12

| | Corn trial-2005 | Soybean trial-2005 | Corn trial-2006 |
|---|---|---|---|
| PLANT POPULATION RESULTS: | | | |
| Untreated standard Fungicide (+insecticide) | 100% | 100% | 100% |
| NO ACTIVE Fungicide (+insecticide) | 104.4% | 100.2% | 107.3% |
| PLUS ACTIVE | 99.7% | 109.7% | 108.5% |
| YIELD RESULTS: | | | |
| Untreated standard Fungicide (+insecticide) | 100% | 100% | 100% |
| NO ACTIVE Fungicide (+insecticide) | 102.6% | 102.9% | 103.6% |
| PLUS ACTIVE | 105.1% | 106.2% | 107.3% |

Based on the plant population results, the presence of a fungicide on seeds reduces seed and seedling death from fungal pathogens and hence increases the stand count over that observed with non-fungicide treated seed. In two of the three cases adding the alkali formononetinate further enhanced stand establishment. Consistent increases in stand establishment have not been observed with formononetin and alkali formononetinate and this is not a registered claim for the material however what is observed is that on average the Active does not inhibit the stand establishment improvement brought about by seed coated fungicides. In this example, over the three trials the increase in stand establishment in the presence of fungicides alone is 4.0% and in the presence of fungicides plus alkali formononetinate it is 6.0%.

Yields are marginally improved where seed is treated with fungicides; in this example the yields were improved by an average of 3.0% and the improvements were consistent across crops and years. When alkali formononetinate was added to the fungicidal treatments the yield increase over the untreated seed plots increased again to an average level of 6.0% greater which is double the increase over that attributable to fungicides alone.

This series of experiments demonstrates that the addition of formononetin and/or alkali formononetinate together with fungicides as a coating on seeds does not negatively affect the disease control effect of the fungicide and neither does it inhibit the yield improving effect of the formononetin and/or alkali formononetinate. The formononetin and/or alkali formononetinate is known to act through the enhancement of mycorrhizal colonization of plant roots as demonstrated in Examples 1 and 2 so clearly combining fungicides in the same seed coating as formononetin and/or alkali formononetinate does not result in the inhibition of beneficial vesicular arbuscular mycorrhizal fungi. Whereas particular embodiments of this invention have been described for purposes of illustration, it will be evident to those persons skilled in the art that numerous variations of the details of the present teaching may be made without departing from the invention as defined in the appended claims. Those patents and publications discussed herein should be viewed as indicative of the level of skill in the art, though no admission is made that any document is a prior art reference. All of the foregoing patents and publications herein, including but not limited to those included in the background of the invention are hereby incorporated by reference. To the extent that the incorporated material conflicts with existing definitions, statements, or other disclosure material set forth in this description, the disclosure as explicitly set forth herein supersedes any conflicting material incorporated by reference.

We claim:

1. A coated seed comprising:
   (a) a seed;
   (b) a coating comprising at least one fungicide that is a quinone outside inhibitor (QoI) fungicide; and at least one compound selected from the group consisting of an isoflavone and an isoflavonoid.

2. The coated seed of claim 1, wherein said compound is selected from the group consisting of hesperetin, formononetin, alkali formononetinate, and mixtures thereof.

3. The coated seed of claim 1, wherein said coating further comprises an insecticide selected from the group consisting of biological/fermentation products, *Agrobacterium radiobacter; Bacillus* strains; *Burkholderia cepacia; Pseudomonas* strains; *Trichoderma* strains; *Streptomyces* strains; carbamates, chloronicotinyls, diacylhydrazines, neonicotinoids, nitroguanidines, organophosphates, oxadiazine derivatives, phenyl pyrazones, pyrazones, pyrethrins, pyrrols, synthetic pyrethroids, thianicotinyls and triazoles.

4. The coated seed of claim 1, wherein said fungicide and said compound are applied as a co-formulation.

5. The coated seed of claim 1, wherein said fungicide and said compound are applied consecutively or simultaneously.

6. The coated seed of claim 1, wherein said compound is an isoflavone, and said isoflavone is an alkali formononetinate selected from the group consisting of sodium formononetinate and potassium formononetinate.

7. A process for producing a coated seed, comprising:
(a) providing a seed;
(b) coating said seed with at least one fungicide that is a quinone outside inhibitor (QoI) fungicide; and
(c) coating said seed with at least one compound selected from the group consisting of an isoflavone and an isoflavonoid.

8. The process of claim 7, wherein said compound is selected from the group consisting of hesperetin, formononetin, alkali formononetinate, and mixtures thereof.

9. The process of claim 7, further comprising coating said seed with an insecticide selected from the group consisting of biological/fermentation products, *Agrobacterium radiobacter*; *Bacillus* strains; *Burkholderia cepacia*; *Pseudomonas* strains; *Trichoderma* strains; *Streptomyces* strains; carbamates, chloronicotinyls, diacylhydrazines, neonicotinoids, nitroguanidines, organophosphates, oxadiazine derivatives, phenyl pyrazones, pyrazones, pyrethrins, pyrrols, synthetic pyrethroids, thianicotinyls and triazoles.

10. The process of claim 7, wherein the coating steps occur consecutively or simultaneously.

11. The process of claim 7, wherein said fungicide and said compound are applied as a co-formulation.

12. The process of claim 7, wherein said compound is an alkali formononetinate selected from the group consisting of sodium formononetinate and potassium formononetinate.

13. The coated seed of claim 1, wherein said fungicide is azoxystrobin.

14. The process of claim 7, wherein said fungicide is azoxystrobin.

* * * * *